(12) United States Patent
Cote

(10) Patent No.: US 8,031,766 B2
(45) Date of Patent: Oct. 4, 2011

(54) PERFORMANCE ADAPTIVE VIDEO ENCODING WITH CONCURRENT DECODING

(75) Inventor: Guy Cote, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1806 days.

(21) Appl. No.: 11/195,053

(22) Filed: Aug. 2, 2005

(65) Prior Publication Data

US 2007/0030898 A1   Feb. 8, 2007

(51) Int. Cl.
*H04N 7/12* (2006.01)
*H04N 11/02* (2006.01)

(52) U.S. Cl. .............. 375/240.01; 375/240.26

(58) Field of Classification Search .......... 375/240.01–240.07, 240.12–240.16, 375/240.25–240.26
See application file for complete search history.

(56) References Cited

U.S. PATENT DOCUMENTS

| | | | |
|---|---|---|---|
| 6,404,814 B1 * | 6/2002 | Apostolopoulos et al. | 375/240.12 |
| 6,577,679 B1 * | 6/2003 | Apostolopoulos | 375/240.12 |
| 7,154,948 B2 * | 12/2006 | Kang et al. | 375/240.01 |
| 7,653,136 B2 * | 1/2010 | Lobo et al. | 375/240.27 |
| 2004/0001545 A1 * | 1/2004 | Chang | 375/240.12 |
| 2004/0093618 A1 * | 5/2004 | Baldwin et al. | 725/101 |
| 2005/0047507 A1 * | 3/2005 | Ju | 375/240.12 |

* cited by examiner

*Primary Examiner* — David Czekaj
(74) *Attorney, Agent, or Firm* — Christopher P. Maiorana, PC

(57) ABSTRACT

An encoder circuit, a task scheduler circuit and a decoder circuit. The encoder circuit may be configured to (i) generate one or more first status signals in response to one or more report signals and (ii) perform video encoding tasks based on available central processing unit (CPU) cycles and memory bandwidth. The task scheduler circuit may be configured to (i) generate a control signal and the one or more report signals in response to the one or more first status signals. The decoder circuit may be configured to (i) generate one or more second status signals and (ii) perform concurrent decoding while the encoder circuit performs adaptive video encoding tasks in response to the control signal.

18 Claims, 3 Drawing Sheets

PERFORMANCE ADAPTIVE VIDEO ENCODING WITH CONCURRENT DECODING

FIELD OF THE INVENTION

The present invention relates to video encoding and decoding generally and, more particularly, to a method and/or apparatus for implementing performance adaptive video encoding with concurrent decoding.

BACKGROUND OF THE INVENTION

Conventional hardware platforms sometimes support concurrent video encoding and decoding. To implement such concurrent video encoding and decoding, common resources need to be shared between encode and decode tasks. While supporting concurrent video encoding and decoding tasks on one hardware platform, a decoding process is typically defined for worse case conditions (i.e., a worst case bitstream), which is usually worse than a typical case. Defining a decoding process for worst case conditions is even more prominent in newer video standards, such as H.264/MPEG-4.

Conventional approaches provide concurrent encoding with a fixed cycle budget based on the worst case decoding. When decoding typical bitstreams, a relatively large amount of performance (i.e., CPU cycles and memory bandwidth) will be wasted if the encoder is designed to use a fixed cycle budget based on the worst case decoding.

It would be desirable to provide a method and/or apparatus to implement an adaptive video encoder to adapt to available CPU cycles and memory bandwidth for concurrent video encoding and decoding.

SUMMARY OF THE INVENTION

The present invention concerns an encoder circuit, a task scheduler circuit and a decoder circuit. The encoder circuit may be configured to (i) generate one or more first status signals in response to one or more report signals and (ii) perform video encoding tasks based on available central processing unit (CPU) cycles and memory bandwidth. The task scheduler circuit may be configured to (i) generate a control signal and the one or more report signals in response to the one or more first status signals. The decoder circuit may be configured to (i) generate one or more second status signals and (ii) perform concurrent decoding while the encoder circuit performs adaptive video encoding tasks in response to the control signal.

The objects, features and advantages of the present invention include providing a method and/or apparatus that may (i) improve the quality of video encoding when concurrently encoding and decoding by simultaneously decoding a bitstream with shared resources, (ii) allow the use of decoding resource utilization information to select various video encoding tasks and/or (iii) improve the efficiency of a CODEC.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
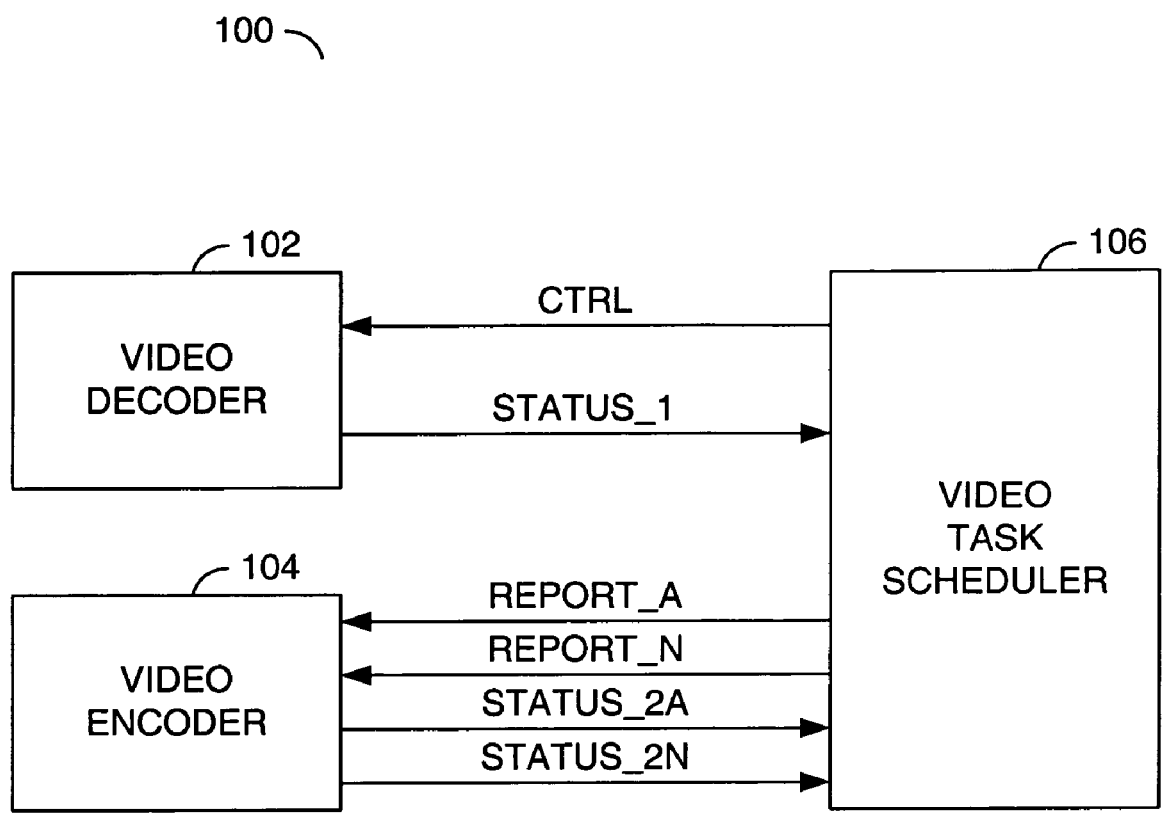
FIG. 1 is a system illustrating the present invention.

Referring to FIG. 1, a block diagram of a system 100 is shown illustrating a preferred embodiment of the present invention. The system 100 generally comprises a block (or circuit) 102, a block (or circuit) 104 and a block (or circuit) 106. The circuit 102 may be implemented as a decoder. In one example, the decoder 102 may be implemented as a video decoder. The circuit 104 may be implemented as an encoder. In one example, the encoder 104 may be implemented as a video encoder. The circuit 106 may be implemented as a task scheduler. In one example, the task scheduler 106 may be implemented as a video task scheduler.

The video decoder 102 may present a signal (e.g., STATUS_1) to the video task scheduler 106. The video task scheduler 106 may present a number of signals (e.g., REPORT_A-REPORT_N) to the video encoder 104. The signals REPORT_A-REPORT_N generally report the available CPU cycles and memory bandwidth available to the video encoder 104. The video task scheduler 106 may present a control signal (e.g., CTRL) to the video decoder 102. The signal CTRL may be used to control the video decoder 102 to decode a video segment generated by the video encoder 104. The video encoder 104 may present a number of signals (e.g., STATUS_2A-STATUS_2N) to the video task scheduler 106. The signals STATUS_2A-STATUS_2N generally report the CPU cycle and memory bandwidth utilization used by various processors (not shown) in the system 100.

In general, video decoding tasks consume a fixed number of CPU cycles and/or memory bandwidth. The consumption of CPU cycles and memory bandwidth depends on the complexity of a bitstream being decoded. Various video encoder tasks used by the encoder 104 may be selected based on available performance. The video encoding tasks will be discussed in more detail in connection with FIG. 2. The video compression performance of various video encoding tasks are generally proportional to the performance needed to fully execute any of the video encoding tasks.

When a limited number of resources are used to perform concurrent encoding and decoding tasks, the video task scheduler 106 informs the video encoder 104 of the cycle and/or memory bandwidth utilization on any of the number of signals REPORT_A-REPORT_N. The video encoder 104 may select any of the video encoding tasks based on the current utilization of CPU cycles and memory bandwidth used by the processors in the system 100. The utilization of memory bandwidth may include the utilization of direct memory access (DMA) bandwidth utilization by the processors in the system 100. The DMA bandwidth may typically be a shared resource among all processors. In one example, during video encoding, a motion estimation process may need a substantial amount of memory bandwidth. During video decode, a difficult bitstream may need a significant amount of memory bandwidth. Generally, the decoding process may not be simplified to use less bandwidth. However, if during the encoding process, the encoder 104 is aware of the memory utilization of all of the processors in the system 100, the encoder 104 may execute the motion estimation process based on the available memory bandwidth. A similar process may apply to other resources being shared (e.g., a common CPU, a motion estimation co-processor, a DSP co-processor, etc.).

In general, while DMA bandwidth may be a shared resource among all processors, the motion estimation process may not use DSP. However, the motion estimation process may still need to know the contribution of the DSP to the DMA utilization. Additional video encoder tasks may be scaled according to performance (e.g., mode decision, rate-distortion optimization, adaptive forward quantization, etc.). Such scaling will be discussed in more detail in connection with FIG. 2. In general, the video decoder 102 and the video encoder 104 generally run in a round-robin fashion. The signal STATUS_1 may include a report of CPU cycles and memory bandwidth utilized by other processors used to perform other video tasks (e.g., decoding). The signal STATUS_2 may include a report of CPU cycle and memory bandwidth by the video encoder 104. The signals STATUS_1 and STATUS_2A-STATUS_2N may include CPU cycle and DMA bandwidth utilization for a motion estimation co-processor, a video digital signal processor (DSP) co-processor, a bitstream encoder/decoder co-processor cycle and/or a number of reduced instruction set computing (RISC) co-processors.

In one example, in an MPEG-2/4, H.264 video encoding process, a mode decision program may be adapted for the available bandwidth and CPU cycles. In terms of compression, an increasingly better mode decision may need an increasingly higher CPU cycle budget.

Figure 2:
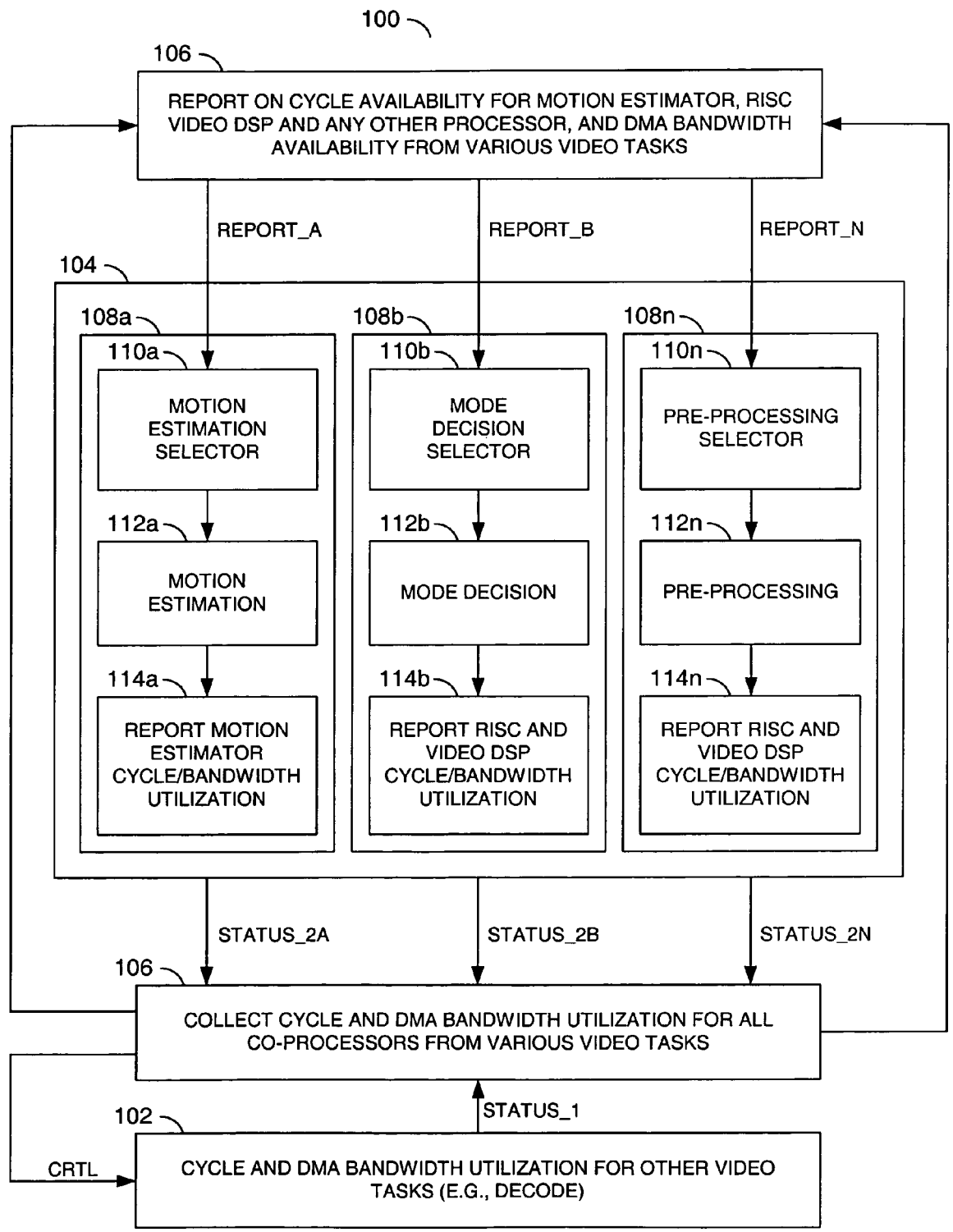
FIG. 2 is a more detailed diagram of the system of FIG. 1.

Referring to FIG. 2, a more detailed diagram of the system 100 is shown. The video encoder 104 generally comprises a number of video encoding tasks 108a-108n. The task 108a may be implemented as a motion estimation task. The task 108b may be implemented as a mode decision task. The task 108n may be implemented as a pre-processing task. The motion estimation task 108a generally comprises a motion estimation selector block 110a, a motion estimation program 112a, and a motion estimation report block 114a. The mode decision task 108b generally comprises a mode decision selector block 110b, a mode decision program 112b and a report mode decision block 114b. The pre-processing task 108n generally comprises a pre-processing selector block 110n, a pre-processing program 112n and a report RISC/DSP block 114n. The pre-processing task 108a may also use a motion estimation co-processor. In general, the video task scheduler 106 may present the signals REPORT_A-REPORT_N to the motion estimation task 108a, the mode decision task 108b, and the pre-processing task 108n. The signal REPORT_A-REPORT_N may include a report on CPU cycle availability for each of the video encoding tasks 108a-108n.

The report motion estimation block 114a, the report mode decision block 114b and/or the report RISC/DSP block 114n may present the signals STATUS_2A-STATUS_2N to the video task scheduler 106. The video task scheduler 106 normally collects the CPU cycle and DMA bandwidth utilization information for all processors (e.g., motion estimation processor, DSP, bitstream encoder/decoder co-processor, and/or RISC co-processors) used to perform the video encoding tasks 108a-108n. The video task scheduler 106 reports the CPU cycle and DMA bandwidth availability of the processors back to the video encoder 104. The video task scheduler 106 may present the signal CTRL to the decoder 102 to initiate decoding the video segment.

Each of the video encoding tasks 108a-108n may be adapted based on CPU cycle and overall DMA availability. In general, the motion estimation program 112a may be adapted based on available CPU cycles and overall available DMA bandwidth all processors used in the system 100. In one example, while the motion estimation program 112a may not use the DSP, the motion estimation selector block 110a may still need to know the contribution of the DSP and all processors in the system 100 to the DMA utilization. In one example, the motion estimation program 112a may be adapted in (i) the horizontal and vertical search ranges, (ii) the precision of the sub-pel accuracy, (iii) the number of reference pictures searched (e.g., in the case of MPEG-4 AVC/H.264), (iv) the decimation ratios used for each step in a hierarchal, or step search motion estimation program, and/or (v) the searches for sub-macroblock block sizes (e.g., in the case of MPEG-4 AVC/H.264: 16×16, 16×8, 8×16, 8×8, 8×4, 4×8, 4×4) in a hierarchal or step search programs.

The mode decision program 112b may be adapted based on the available CPU cycles and where available overall DMA bandwidth exists from the RISC co-processor, the DSP co-processor or any other processor. In one example, while the mode decision program 112b may not use the various functions performed by processors in the system 100. The mode decision selector block 110b may need knowledge of the overall contribution of all processors in the system 100 to the DMA utilization. The mode decision program 112b may also be adapted in various ways. In one example, the mode decision program 112b may be adapted by varying the number of test mode candidates tested. In a rate-distortion optimized encoder, the number of tested candidates for distortion and rate may be selected based on available CPU cycles. In another example, for the case of MPEG-4 AVC/H.264, possible modes for testing may include (i) direct/skip, (ii) block size (16×16, 16×8, 8×16, 8×8, 8×4, 4×8, 4×4), (iii) prediction direction (L0 or L1), (iv) bi-directional, (v) reference frames used (e.g., ref0-5). A substantial amount of DSP, RISC and DMA cycles may be needed when testing for a mode. Therefore, selecting the modes to be tested based on available cycles may be important. The priority of the modes to test may be based on the benefits in terms of compression improvement for the different modes. For example, block sizes of 16×16, 16×8, 8×16, 8×8 may be tested if the available resources are low. Block sizes of 8×4, 4×8, 4×4 may be tested if more resources are available. The order in which to allocate the particular mode to test may be adjusted based on experimental results to meet the design criteria of a particular implementation.

The pre-processing program 112n may be adapted based on available CPU cycles and available overall DMA bandwidth from the motion estimation co-processor, the RISC co-processor, the DSP co-processor or any other processor used to perform pre-processing tasks. The pre-processing program 112n may be adapted in various ways. In one example, while the pre-processing program 112n may not use various functions performed by the processors in the system 100. The pre-processing selector block 110n may need knowledge of the overall contribution of all processors in the system 100 to the DMA utilization. In one example, in a motion adaptive pre-processing program (not shown), the motion estimation program 112a may be adapted by varying (i) the horizontal and vertical search ranges, (ii) the precision of the sub-pel accuracy, (iii) the number of reference pictures searched, and/or (iv) the block sizes searched. Pre-processing typically needs a large amount of filtering (generally adaptive) which may demand additional CPU cycles from the RISC and DSP co-processors. The complexity of the filtering operations may be adapted based on the resources available. The priority of the filtering operations to perform filtering may be based on the benefits in terms of compression and visual quality improvements for the different operations. The priority of the filtering operations may be adjusted based on experimental results to meet the design criteria of a particular implementation.

Figure 3:
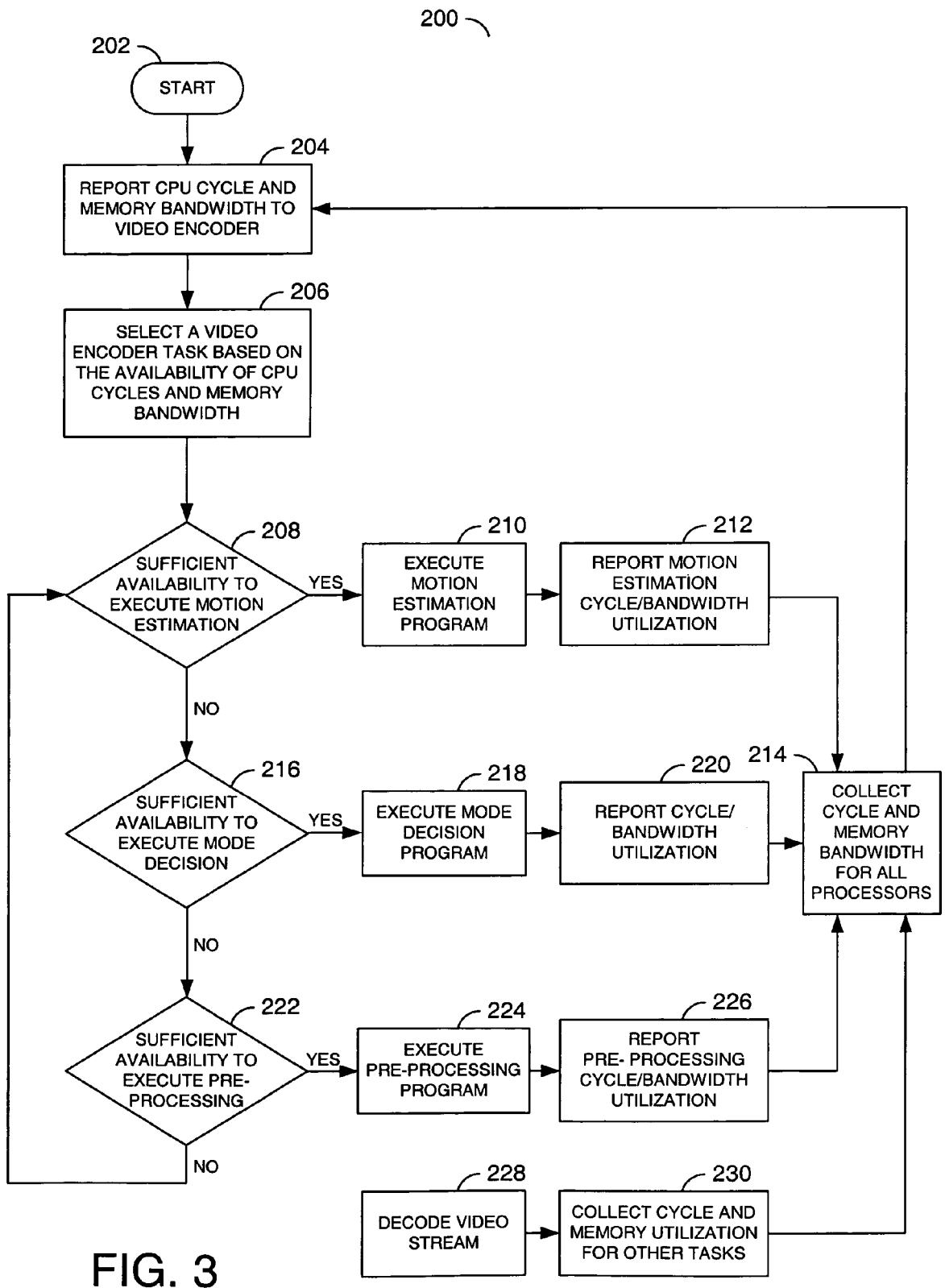
FIG. 3 is a diagram of a process implementing an adaptive encoder in accordance to the present invention.

Referring to FIG. 3, a method 200 for implementing an adaptive encoder with concurrent decoding is shown. The method 200 generally comprises a state (or step) 202, a state (or step) 204, a state (or step) 206, a decision state 208, a state (or step) 210, a state (or step) 212, a state (or step) 214, a decision state 216, a state (or step) 218, a state (or step) 220, a decision state 222, a state (or step) 224, a state (or step) 226, a state (or step) 228 and a state (or step) 230. The state 202 generally comprises a start state. Next, the state 204 generally reports the CPU cycle and memory bandwidth availability for all processors to the encoder 104. Next, the state 206 generally selects a video encoder task 108a-108n based on the availability of CPU cycles and memory bandwidth. Next, the decision state 208 generally determines if there is sufficient CPU cycle and memory bandwidth available to execute the motion estimation task 108a. If there is sufficient availability of CPU cycles and memory bandwidth, the method 200 moves to state 210. In the state 210, the motion estimation selector 110a selects the motion estimation program 112a to execute the motion estimation task 108a. The state 212 generally reports the CPU cycle and memory bandwidth utilized while executing the motion estimation task 108a. The state 214 generally collects the CPU cycle and memory bandwidth utilization for all processors and for all video encoding tasks 108a-108n for any processor implemented in the system 100. If there is not sufficient CPU cycle and memory bandwidth available, the method 200 moves to decision state 216.

The decision state 216 generally determines if there is sufficient CPU cycle and memory bandwidth available to execute the mode decision task 108b. If there is sufficient availability of CPU cycles and memory bandwidth, the method 200 moves to state 218 and the mode decision selector 110b selects the mode decision program 112b to execute the mode decision task 108b. The state 220 reports the CPU cycle and memory bandwidth to the state 214. If there is not sufficient CPU cycle and memory bandwidth available, the method 200 moves to decision state 222.

The decision state 222 generally determines if there is sufficient CPU cycle and memory bandwidth available to execute the pre-processing task 108n. If there is sufficient availability of CPU cycles and memory bandwidth, the method 200 moves to state 224 and the pre-processing decision selector 110a selects the pre-processing program 112n to execute the pre-processing task 108n. The state 226 generally comprises reporting the CPU cycle and the memory bandwidth utilized when executing the pre-processing task 108n. The state 226 reports the RISC and video DSP Cycle/Bandwidth utilization to the state 214. If there is not sufficient CPU cycles and memory bandwidth available, the decision state 222 moves back to the decision state 208 to determine if there is sufficient availability to execute the motion estimation task 108a.

The state 228 generally decodes the video stream generated by the video encoder 104 with the video decoder 102. The state 230 generally collects CPU cycle and DMA bandwidth utilization for other video tasks including the CPU cycles and DMA bandwidth utilization with the video task scheduler 106 while decoding the video stream with the video decoder 104. The state 230 provides the CPU cycles and the DMA bandwidth utilization on the signal STATUS_1. The method 200 moves to the state 204 where the video task scheduler 106 collects the CPU cycle and the DMA bandwidth for all processors and the video encoder tasks 108a-108n.

The present invention may (i) allow the use of decoding resource utilization information to select video encoding processes, and/or (ii) improve the quality of video encoding in a concurrency scenario (e.g., while simultaneously decoding a bitstream on shared resources). The present invention may be used in a that is needed to support concurrent video encode and decode. The present invention may be implemented with a variety of standard product chips, DSP processors, and/or personal computers.

The functions performed by the flow diagram of FIG. 3 may be implemented using a conventional general purpose digital computer programmed according to the teachings of the present specification, as will be apparent to those skilled in the relevant art(s). Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMS, EEPROMs, Flash memory, magnetic or optical cards, or any type of media suitable for storing electronic instructions.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
    an encoder circuit configured to perform video encoding tasks based on available central processing unit (CPU) cycles and memory bandwidth, wherein an indication of said available bandwidth and processing cycles are received through one or more report signals received by said encoder circuit;
    a task scheduler circuit configured to (i) generate a control signal and said one or more report signals in response to one or more status signals; and
    a decoder circuit configured to (i) generate said one or mored status signals and (ii) perform concurrent decoding while said encoder circuit performs adaptive video encoding tasks in response to said control signal, wherein said one or more report signals provide information concerning bandwidth and processing cycles available to said encoder circuit after determining sufficient bandwidth and processing cycles needed to perform said decoding by said decoder circuit.

2. The apparatus according to claim 1, wherein said encoder circuit comprises:
    a motion estimation task configured to execute a motion estimation program based on available CPU cycles and memory bandwidth;
    a mode decision task configured to execute a mode decision program based on available CPU cycles and memory bandwidth; and
    a pre-processing task configured to execute a pre-processing program based on available CPU cycles and memory bandwidth.

3. The apparatus according to claim 1, wherein said encoder circuit is further configured to generate one or more second status signals to provide information concerning bandwidth utilized to perform said video encoding tasks.

4. An apparatus comprising:
means for performing video encoding tasks based on available central processing unit (CPU) cycles and memory bandwidth, wherein an indication of said available bandwidth and processing cycles are received through one or more report signals received by an encoder circuit;
means for generating a control signal and said one or more report signals in response to one or more status signals;
means for generating said one or more status signals; and
means for concurrently decoding while adaptively encoding tasks in response to said control signal, wherein said one or more report signals provide information concerning bandwidth and processing cycles available to said encoder circuit after determining sufficient bandwidth and processing cycles needed to perform said decoding by said decoder circuit.

5. A method for adaptive video encoding, comprising the steps of:
(A) reporting central processing unit (CPU) cycles and memory bandwidth of a plurality of processors to a video encoder, wherein an indication of said memory bandwidth and said CPU cycles are received through said reporting received by said video encoder;
(B) performing concurrent video encoding and video decoding tasks, wherein said reporting provides information concerning bandwidth and processing cycles available to said video encoder after determining sufficient bandwidth and processing cycles needed to perform said video decoding tasks by a video decoder;
(C) selecting one or more of said video encoding tasks to be performed based on the availability of said CPU cycles and said memory bandwidth; and
(D) executing said one or more video encoding tasks.

6. The method according to claim 5, wherein step (D) further comprises the step of:
collecting said CPU cycles and said memory bandwidth from said plurality of processors.

7. The method according to claim 6, further comprising the step of:
repeating step (A) in response to collecting said CPU cycle and said memory bandwidth.

8. The method according to claim 5, wherein step (C) further comprises the step of:
selecting a motion estimation task based on the availability of said CPU cycles and said memory bandwidth.

9. The method according to claim 5, wherein step (C) further comprises the step of:
selecting a mode decision task based on the availability of said CPU cycles and said memory bandwidth.

10. The method according to claim 5, wherein step (C) further comprises the step of:
selecting a pre-processing task based on the availability of said CPU cycles and said memory bandwidth.

11. The method according to claim 5, wherein step (D) further comprises the step of:
executing a motion estimation program.

12. The method according to claim 11, further comprising the step of:
reporting said CPU cycles and said memory bandwidth in response to executing said motion estimation program.

13. The method according to claim 5, wherein step (D) further comprises the step of:
executing a mode decision task.

14. The method according to claim 13, further comprising the step of:
reporting said CPU cycles and said memory bandwidth in response to executing said mode decision tasks.

15. The method according to claim 5, wherein step (D) further comprises the step of:
executing a pre-processing task.

16. The method according to claim 15, further comprising the step of:
reporting said CPU cycles and said memory bandwidth in response to executing said pre-processing task.

17. The method according to claim 16, further comprising the step of:
collecting said CPU cycles and said memory bandwidth from a plurality of processors while decoding said video stream.

18. The method according to claim 5, further comprising the step of:
providing information concerning bandwidth utilized to perform said video encoding and said video decoding tasks.

* * * * *